Figure 1:
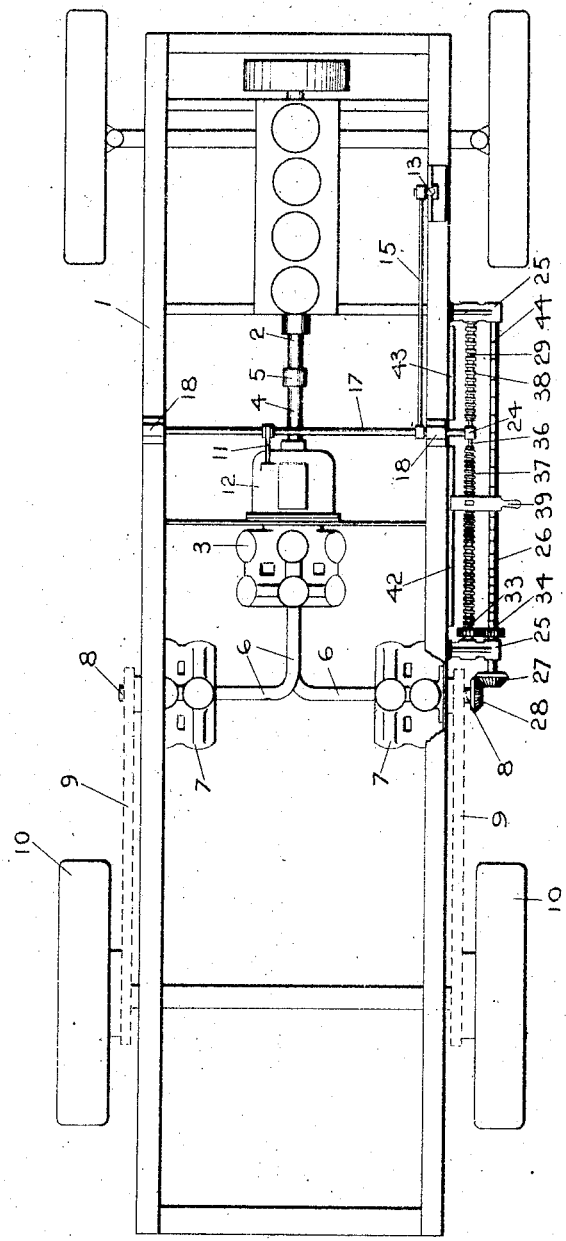

C. M. MANLY.
CONTROLLING DEVICE FOR MOTOR VEHICLES.
APPLICATION FILED JUNE 21, 1911.

1,187,639.

Patented June 20, 1916.
2 SHEETS—SHEET 1.

Attest:
S. Newman
Ada I. Miller by
W. B. Morton

Inventor:
Charles M. Manly,

Atty

C. M. MANLY.
CONTROLLING DEVICE FOR MOTOR VEHICLES.
APPLICATION FILED JUNE 21, 1911.
1,187,639.
Patented June 20, 1916.
2 SHEETS—SHEET 2.
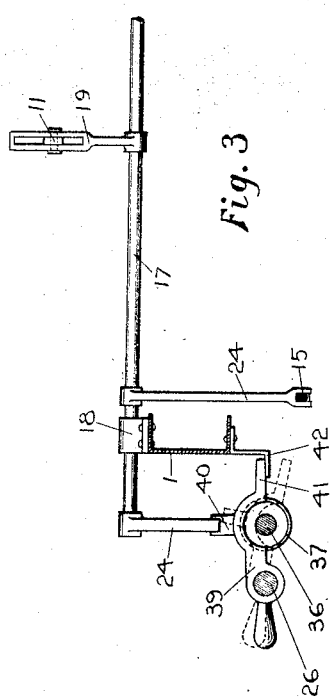
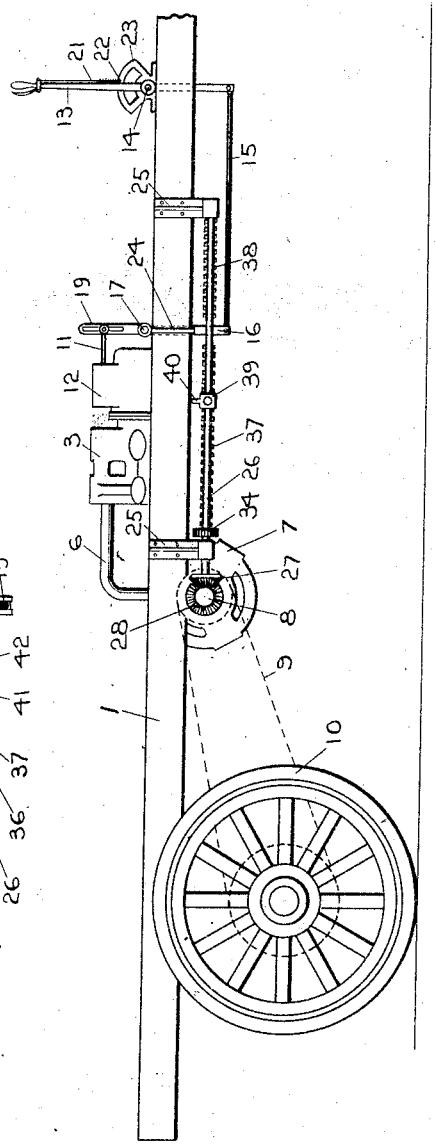
Attest:
Inventor:
Charles M. Manly,
by
W. B. Morton
Atty

UNITED STATES PATENT OFFICE.

CHARLES MATTHEWS MANLY, OF BROOKLYN, NEW YORK.

CONTROLLING DEVICE FOR MOTOR-VEHICLES.

1,187,639.  Specification of Letters Patent.  Patented June 20, 1916.

Application filed June 21, 1911. Serial No. 634,598.

*To all whom it may concern:*

Be it known that I, CHARLES M. MANLY, a citizen of the United States, residing at Brooklyn, in the county of Kings, State of New York, have invented certain new and useful Improvements in Controlling Devices for Motor-Vehicles, of which the following is a specification.

My invention relates to controlling devices for vehicles and has for its object to provide a stop mechanism therefor which may be set to automatically bring the vehicle to a stop at any desired distance from the position of the vehicle when the mechanism is set.

A further object of the invention is to provide a mechanism of the character described which will be simple in construction and efficient in operation.

In the accompanying drawings I have illustrated a preferred embodiment of my invention as applied to a motor vehicle having a hydraulic variable speed transmission of the character disclosed in my application, Serial No. 606,618 filed February 4, 1911.

It is to be understood however that my invention is not limited to such application or to the details of the invention here shown but covers all such modifications of the same as fall within the scope of the appended claims.

In the drawings, Figure 1 is a plan view of the chassis of a motor vehicle of the class described equipped with my invention. Fig. 2 is a side elevation of a portion of the vehicle shown in Fig. 1. Fig. 3 is a detail view hereinafter referred to.

In the accompanying drawings in which the same parts are indicated by the same reference characters throughout the several views, 1 indicates the frame of the vehicle and 2 the shaft of an internal combustion engine 2ª mounted on the forward part of the frame in the usual manner. Back of the engine and suitably supported by the frame is a hydraulic transmission of the same general character as that disclosed in my application above referred to. As this transmission *per se* forms no part of the present invention, the details of its construction are not disclosed in this application, but so much of the same will now be described as is necessary to an understanding of the construction and operation of my improved controlling mechanism. The transmission comprises essentially a multi-cylinder variable stroke pump 3 the shaft 4 of which is coupled to the engine shaft at 5. Coupled to the pump by suitable fluid connections 6 to be driven by the fluid therefrom are two hydraulic motors 7, the shafts 8 of which are connected by driving chains indicated in dotted lines at 9 to the rear wheels 10 of the vehicle. Mear are provided to vary the stroke of the pump pistons, so as to vary the amount and direction of the flow of fluid from a maximum flowing in one direction through zero to a maximum flowing in the opposite direction and this means is controlled by a sliding control bar 11 mounted in the control mechanism casing 12. It will be understood that the control bar 11 has a central neutral position in which the pump stroke is at its zero position and the vehicle stationary, and that movement of the bar in either direction from its neutral position causes the vehicle to move in a corresponding direction and at a speed proportional to the extent of movement of the control bar. It will also be understood that when the control bar is moved from a running position back to its neutral position the driving wheels are not only relieved of the driving power but the fluid in the transmission acts as a hydraulic brake and brings the vehicle to a stop.

For operating the control bar, a lever 13 is provided, the said lever being pivoted intermediate its ends to the frame at 14. The lower end of the lever 13 is connected by a rod 15 to an arm 16 depending from a shaft 17 mounted transversely of the vehicle for oscillation in bearings 18 on the side members of the frame. On the shaft 17 at a point adjacent the casing 12 an upstanding arm 19 is mounted, which arm has a pin and slot connection with the control bar 11. The lever 13 is provided with a locking pawl 21 adapted to engage a notch 22 in a quadrant 23, the position of the notch being such as to hold the lever in the position corresponding with the zero position of the control bar 11.

The shaft 17 projects at one end beyond the frame and is provided with a depending arm 24 the purpose of which will be hereinafter described. Mounted in brackets 25 attached to the frame at either side of the projecting end of the shaft 17 is a shaft 26 extending parallel with the frame and provided at its rear end with a beveled gear 27 meshing with a beveled gear 28 attached to the end of the shaft 8 of the motor on that side of the vehicle. Parallel with the shaft 26 and arranged between the shaft 26 and the side of the vehicle is a shaft 29 also rotatably supported in the brackets 25. The shaft 29 is driven from the shaft 26 by means of a spur gear 33, attached to the rear end of said shaft meshing with a gear 34 on the shaft 26. The shaft 29 is formed with two enlarged screw threaded portions 37, 38, spaced from each other by a central reduced portion 36 and extending nearly to the supporting bearings, and loosely mounted on the shaft 26 so as to be both slidable and rotatable thereon is a heavy half-nut 39 the threaded portion of which is adapted to engage either of the threads 37, 38. The shaft 26 is preferably provided with graduations 44 to indicate the position of the nut.

The half-nut 39 is provided with a projecting lug 40 opposite its screw threaded portion adapted, when the nut is moved along either thread by the rotation of the shaft, to engage the end of the arm 24 on the shaft 17 of the control mechanism and move the arm from either a forward or reverse running position to its zero position. The length of the reduced portion 36 is such that when the arm 24 reaches its zero position from either direction, through the action of the nut, the nut will run off the thread and drop to an inoperative position out of engagement with the arm 24. To better support the nut and relieve to some extent the friction of its threaded engagement, the nut may be provided with an extension 41 adapted to rest on supports 42, 43 attached to the vehicle frame adjacent the shaft 29, and so positioned that the extension runs off the support just as the nut runs off the corresponding thread.

The operation of the device will now be described.

Assuming that the vehicle is stationary, with the half-nut 39 in its inoperative position and the control mechanism at its zero position, should the operator desire to send the vehicle forward alone a short distance he moves the half-nut over onto the threaded portion 37 into its full line position as shown in Fig. 3 at the proper distance as indicated by the graduations 44 from the end of the threads for the car to traverse the desired distance, and then moves the control lever 13 slightly forward to start the car at a slow speed. This movement of the lever 13 causes the end of the arm 24 to move slightly backward into a position to be engaged by the lug 40 on the half-nut 39 as it nears the end of the threads 37. Further advance of the half-nut carries the lower end of the arm forward and returns the control mechanism to its zero position, thereby stopping the vehicle. The operator may run the vehicle backward in the same manner except that he places the nut on the threaded portion 38, and moves the lever 13 backward instead of forward. In either operation at the moment that the arm 24 reaches its zero position the half-nut runs off the end of the threaded portion and assumes its inoperative position. The advantage of this central reduced portion is that the operator may start the vehicle again in the usual manner without further manipulation of the automatic stop mechanism.

I have shown my automatic stop mechanism applied to a vehicle equipped with my hydraulic transmission but it is obvious that it may be applied to any power vehicle having a shiftable control member for stopping it, as for instance the clutch and brake operating pedal of a gear driven automobile. It may also be applied to vehicles without power to set the brakes after a predetermined distance has been traversed, as the cars of a so-called "gravity" railroad.

My control mechanism is particularly useful in connection with power operated delivery wagons, such as milk wagons, where a number of deliveries are made at closely adjacent points. The operator may fill his basket or crate with enough bottles to supply a block or row and set the control mechanism to run the wagon to the end of the row while he goes from house to house, thereby saving the time necessary to get into and out of the vehicle at each delivery.

Another use of my control mechanism which may be mentioned is in connection with the distributing cars in mills and factories which are run from place to place to receive or deliver the material handled by the operatives.

I claim,

1. In a motor vehicle, the combination with means for driving and stopping the vehicle, of manually operatable means for controlling said driving means and stopping means, comprising a shiftable member and auxiliary means for operating said controlling means comprising a movable member driven by said driving means and having a movement variable in extent at will, said movable member being adapted to engage and operate said shiftable member to render said driving means inoperative and positively stop said vehicle.

2. In a motor vehicle, the combination of means for driving said vehicle and for stopping said vehicle manually operatable means for controlling said driving and stopping means, and auxiliary means actuated by said driving means for operating said control means to render said driving means operative and cause said vehicle to stop when the vehicle has traversed a predetermined distance after the operation of said auxiliary means begins, substantially as described.

3. In a motor vehicle, the combination of means for driving said vehicle in either forward or reverse directions and for stopping said vehicle manually operatable means for controlling said driving and stopping means, and auxiliary means actuated by said driving means for operating said control means to render said driving means inoperative and cause said vehicle to stop when the vehicle has traversed a predetermined distance in either direction after the operation of said auxiliary means begins, said last named means being adjustable so that said distance may be varied, substantially as described.

4. In a motor vehicle the combination with a variable speed hydraulic transmission having a shiftable member for rendering said transmission inoperative of means operatable at will for shifting said member to an inoperative position when said vehicle has traversed a predetermined distance after the operation of said means, substantially as described.

5. In a motor vehicle the combination with a hydraulic transmission having a shiftable control member adapted when moved to a certain position to cause said vehicle to stop of means operatable at will for shifting said member to its "stop" position when said vehicle has traversed a predetermined distance after the operation of said means, substantially as described.

6. In a motor vehicle the combination with a hydraulic transmission having a shiftable control member adapted when moved to a certain position to cause said vehicle to stop of means operatable at will for shifting said member to its "stop" position when said vehicle has traversed a predetermined distance after the operation of said means, said last named means being adjustable so that said distance may be varied, substantially as described.

7. The combination with a part to be driven of means for driving said part, means for controlling said driving means to start, stop and vary the speed of said part, and means actuated by said driven part for operating said control means to stop said driven part.

8. The combination of a part to be driven, driving means therefor, control means for said driving means operatable at will to start, stop and vary the speed of said driven part, and means actuated by said driven part for operating said control means.

9. The combination of a part to be driven, driving means therefor, control means for said driving means operatable at will to start, stop, reverse and vary the speed of said driven part, and means controlled by the movement of said driven part for operating said control means.

10. The combination with a part to be driven, of driving means therefor embodying a variable speed gear, means for controlling said speed gear operatable at will to start, stop and vary the speed of said driven part, and means operatable by said driven part for actuating said control means to stop said driven part.

11. The combination of a part to be driven, a driving mechanism therefor embodying a variable speed means for controlling said speed gear comprising a member movable to different positions to start, stop and vary the speed of said driven part, and means having driving engagement with the driven part for moving said control member to a position to stop said driven part.

12. The combination of a part to be driven, driving mechanism therefor embodying a hydraulic variable speed gear, a control member therefor movable to different positions to start, stop and vary the speed of said driven part, an automatic means for moving the said control member to a position to start said driven part comprising a screw-threaded member driven by said driven member, and a member operated longitudinally by said screw-threaded means to actuate said control member.

13. The combination of a part to be driven, driving mechanism therefor embodying a hydraulic variable speed gear, a control mechanism for said gear comprising a manually movable member for starting said driven part, automatic means for adjusting said control mechanism to stop said driving part comprising a screw threaded member driven by said driven member and a part operated by the rotation of said screw threaded member for shifting said speed gear control to its stopped position.

14. The combination of a part to be driven, a hydraulic variable speed gear for driving same comprising a variable stroke pump and a motor driven by fluid from said pump, means for varying the stroke of said pump from zero to its maximum stroke comprising a manually operable member and means for returning the pump stroke to zero comprising a screw threaded member driven by said motor and devices operated by the rotation of said screw threaded member for operating said pump stroke controlling means.

15. In a mechanism of the class described, the combination of a driving and reverse gear embodying a driving and driven part, means operatable at will for controlling said gear to start said driven part in either direction and stop the same, automatic means operated by the driven part for actuating said control means to stop said driven part, and means whereby said automatic means is disconnected from said control means, when said gear is stopped to permit free operation of said control means.

In testimony whereof, I have signed my name to this specification, in the presence of two subscribing witnesses, this 17th day of June, 1911.

CHARLES MATTHEWS MANLY

Witnesses:
 ADA I. MILLER,
 SIGMUND NEWMAN.